(12) United States Patent
Cropper et al.

(10) Patent No.: US 6,989,842 B2
(45) Date of Patent: Jan. 24, 2006

(54) SYSTEM AND METHOD OF INTEGRATING LIVE VIDEO INTO A CONTEXTUAL BACKGROUND

(75) Inventors: Kevin M. Cropper, Columbia, MD (US); Jarrett F. Reid, Ellicott City, MD (US); David W. Nesbitt, Adamstown, MD (US)

(73) Assignee: The Johns Hopkins University, Baltimore, MD (US)

( * ) Notice: Subject to any disclaimer, the term of this patent is extended or adjusted under 35 U.S.C. 154(b) by 163 days.

(21) Appl. No.: 10/363,089

(22) PCT Filed: Oct. 25, 2001

(86) PCT No.: PCT/US01/50390

§ 371 (c)(1),
(2), (4) Date: Feb. 28, 2003

(87) PCT Pub. No.: WO02/39385

PCT Pub. Date: May 16, 2002

(65) Prior Publication Data

US 2003/0179217 A1 Sep. 25, 2003

Related U.S. Application Data

(60) Provisional application No. 60/244,053, filed on Oct. 27, 2000.

(51) Int. Cl.
*G09G 5/10* (2006.01)

(52) U.S. Cl. .......................... 345/629; 345/582; 345/630
(58) Field of Classification Search ................ 345/629, 345/582, 630
See application file for complete search history.

(56) References Cited

U.S. PATENT DOCUMENTS 6,331,852 B1 * 12/2001 Gould et al. ................ 345/419

6,469,710 B1 * 10/2002 Shum et al. ................. 345/619
6,529,613 B1 * 3/2003 Astle ........................... 382/103
6,583,793 B1 * 6/2003 Gould et al. ................ 345/679
6,734,873 B1 * 5/2004 Herf et al. ................... 345/629

FOREIGN PATENT DOCUMENTS

WO   WO 98/38908   9/1998

OTHER PUBLICATIONS

Composting Computer Graphics and Real World Video Sequences, Computer Networks & ISDN Systems 30(1998), 2047–2057, by Rokita.

Three Dimensional Terrain: Modeling and Display for Environmental Assessment, PDB/1988, p. 463–477, by Kaneda et al.

PCT International Search Report PCT/US01/50390 Filed Jan. 20, 2003.

* cited by examiner

*Primary Examiner*—Michael Razavi
*Assistant Examiner*—Motilewa Good-Johnson
(74) *Attorney, Agent, or Firm*—Albert J. Fasulo, II

(57) ABSTRACT

A live video feed is seamlessly inserted into a static background image while maintaining the proper positioning and scaling of the combined image. The current frame of the live video feed is first texturized onto a surface. The surface is a set of points that are translated to the location, e.g., latitude/longitude coordinates, of the live video source. A series of matrix transformations of the texturized surface coordinates is performed. First, the texturized surface is rotated to be tangential to the earth at the location of the live video source. Next, the texturized surface is rotated again to reflect the heading of the live video source. Lastly, the texturized surface is scaled to conform to the background image. The transformed live image is then inserted into the larger background image in its proper position and displayed.

7 Claims, 2 Drawing Sheets

SYSTEM AND METHOD OF INTEGRATING LIVE VIDEO INTO A CONTEXTUAL BACKGROUND

CROSS-REFERENCE TO RELATED APPLICATIONS

The present invention is related to, and claims the benefit of, U.S. Provisional Patent Application No. 60/244,053 filed Oct. 27, 2000 entitled, "Real-Time Video Integration with Mapping Software".

This invention was made with U.S. Government support under Navy contract No. N0024-98-D-8124. The U.S. Government has certain rights in this invention.

FIELD OF THE INVENTION

The present invention relates generally to a system and method for integrating live video into a contextual background. More specifically, the present invention relates generally to a system and method for integrating live aerial video onto a broader background map in order to provide a larger context for the live video.

BACKGROUND OF THE INVENTION

There are many uses for live video that include military applications, search and rescue, and general surveillance among others. While receiving a live video feed certainly provides much useful information for the task at hand, often it is difficult to interpret the data without having a broader perspective. For instance, consider a search and rescue mission that is utilizing aerial video to assist in finding a lost person. The field of view of the camera is limited. The ability to dynamically insert the live video into a broader background image greatly enhances the useful information. With a larger background, anything of interest that is spotted by the live video can instantly be correlated to any number of landmarks that are outside the view of the camera. This can allow for more efficient rescue operations if, for instance, the location can be immediately put into a larger perspective that includes the roads that will lead to the person the quickest.

Current existing products for displaying a video feed over another image are not nearly robust enough to allow for a dynamic repositioning of the camera providing the video feed.

What has not yet been achieved is a system or method that displays a background image that contains a smaller live image placed over a portion of the larger background image such that the live image is correctly positioned and scaled with respect to the background image.

Thus, what is needed is a system and method that can display an image of a live picture that is placed correctly relative to a background image. Moreover, the system should be dynamic in nature allowing the live picture to be moved around the background image in real-time.

SUMMARY OF THE INVENTION

In order to seamlessly insert a live video feed into a static background image while maintaining the proper positioning and scaling of the combined image the live video feed is first texturized onto a surface. The surface is a set of points that are translated to the location, e.g., latitude/longitude coordinates, of the live video source. A series of matrix transformations of the texturized surface coordinates is performed. First, the texturized surface is rotated to be tangential to the earth at that location. The location information is synchronized with the live video feed and is passed along with the live video feed in a position information signal to the processing device performing the coordinate transformations. Next, the texturized surface is rotated again to reflect the heading of the live video source. The heading information, including pitch, yaw, and roll, etc. of the camera is also included in the position information signal that accompanies the live video feed. Lastly, the texturized surface is scaled to conform to the background image and the transformed live image is inserted into the larger background image in its proper position.

Other aspects and features of the present invention will become apparent to those ordinarily skilled in the art upon review of the following description of specific embodiments of the invention in conjunction with the accompanying figures.

DETAILED DISCLOSURE OF THE INVENTION

The insertion of a smaller image into a larger image gives a new perspective to the smaller image in that it can be viewed in the context of a much larger picture. The new perspective provides additional information not available by viewing just the smaller image alone. In order to seamlessly insert a live video feed into a larger background image, the live video feed must be processed so that it can be properly positioned within the background image. The goal is to allow the smaller image to be properly positioned within the larger image and to allow the smaller image to be moved seamlessly and in real-time all over the background image.

The description herein relates to a typical application of the present invention that involves an unmanned aerial vehicle (UAV) having a video source (camera) mounted thereon. The UAV flies over an area providing live video via its camera to a remotely situated display viewable by a system operator. This application is merely illustrative as it provides an environment within which to describe the processes performed by the present invention. Those of ordinary skill in the art can readily devise other applications without departing from the spirit or scope of the present invention.

Figure 1:
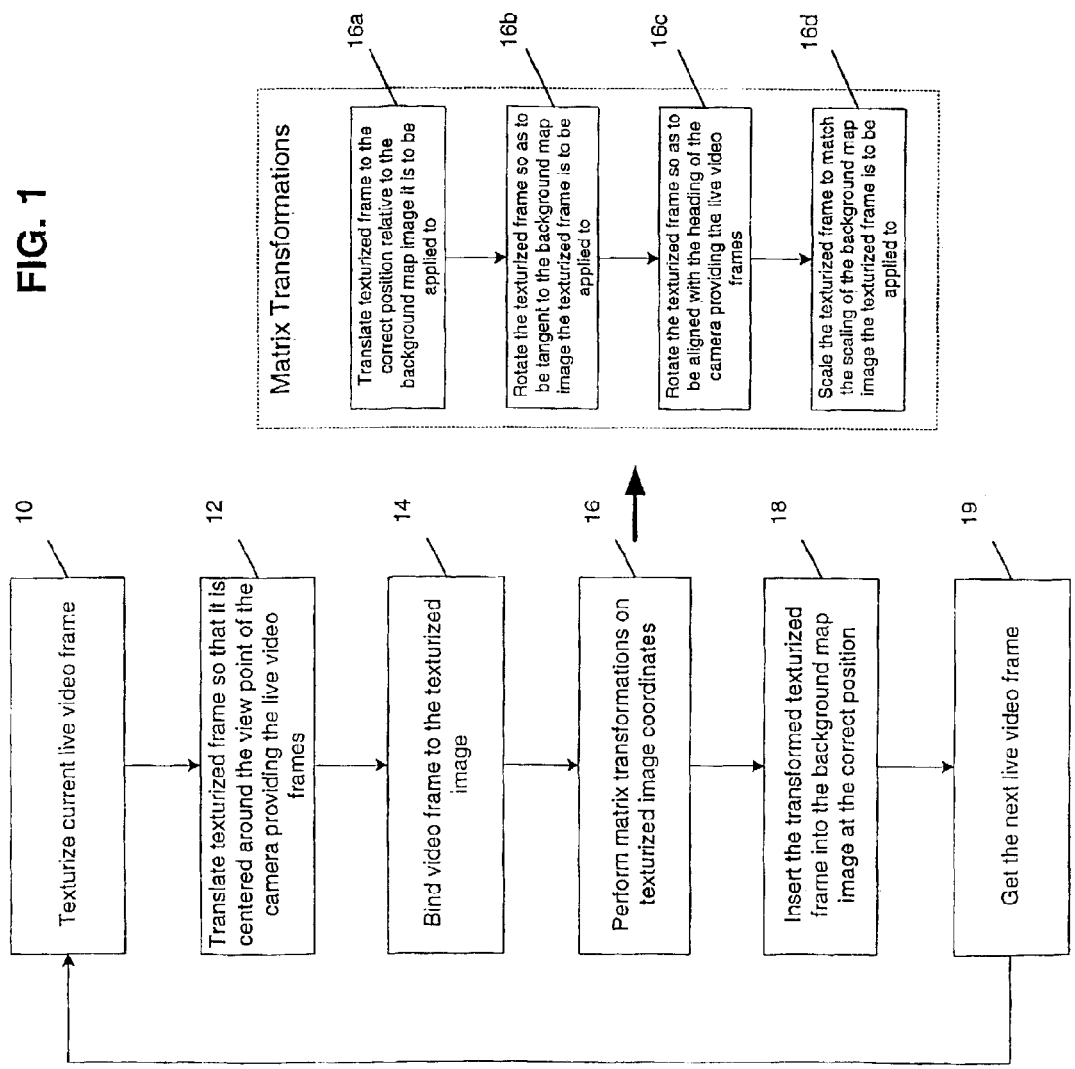
FIG. 1 is a flowchart describing the steps comprising the present invention.

FIG. 1 is a flowchart describing the steps comprising the present invention. The present invention utilizes a double buffer system. Each buffer includes data for both the current live video frame and the background image. One buffer is subjected to a series of processing steps and upon completion of the processing, it is swapped to the display screen. Double buffering allows for a more eye appealing screen display that is not disjointed. Each frame of the live video feed is individually processed and the screen display is refreshed for each frame.

The first step is to texture map or "texturize" the current live video frame 10 onto a surface. Texture mapping is a well-known process that involves taking a picture and drawing it onto a polygon such as a triangle. There are many texture mapping processes that currently exist. One embodiment of the present invention uses the Silicon Graphics "OpenGL" set of tools to perform texture mapping and coordinate transformations. The next step is to translate the texturized frame so that it is centered on the viewpoint of the video source (camera) 12. The video frame is then bound to the texturized image 14.

A series of matrix transformations are performed on the texturized image 16 in order to make the live video frame seamlessly insertable into the larger background image. The first matrix transformation involves translating the texturized frame to the correct position relative to the background image 16*a*. In order to perform this step, the live video feed from the video source must be synchronized with precise information pertaining to the current status of the video source. Status information includes, but is not limited to, orientation, pitch, roll, and zoom. Mere position and heading information is insufficient, because image jitter introduced as the video source turns or is buffeted by wind causes the video source to no longer point straight down. Without precise position information, the live video and the background image map will not be synchronized.

The next transformation is to rotate the texturized frame so it is tangent to the background image 16*b*. In other words, the texturized image is warped to conform to the surface of the background image. This is followed by rotating the texturized image again so that it is aligned with the current heading of the video source 16*c*. Lastly, the texturized image is scaled to conform to the scaling factor of the background image 16*d*.

Once the texturized image has been completely transformed, it can be inserted 18 into the background image in its proper position. The processed buffer is swapped onto the display screen for viewing and the next live video frame is obtained 19.

Figure 2:
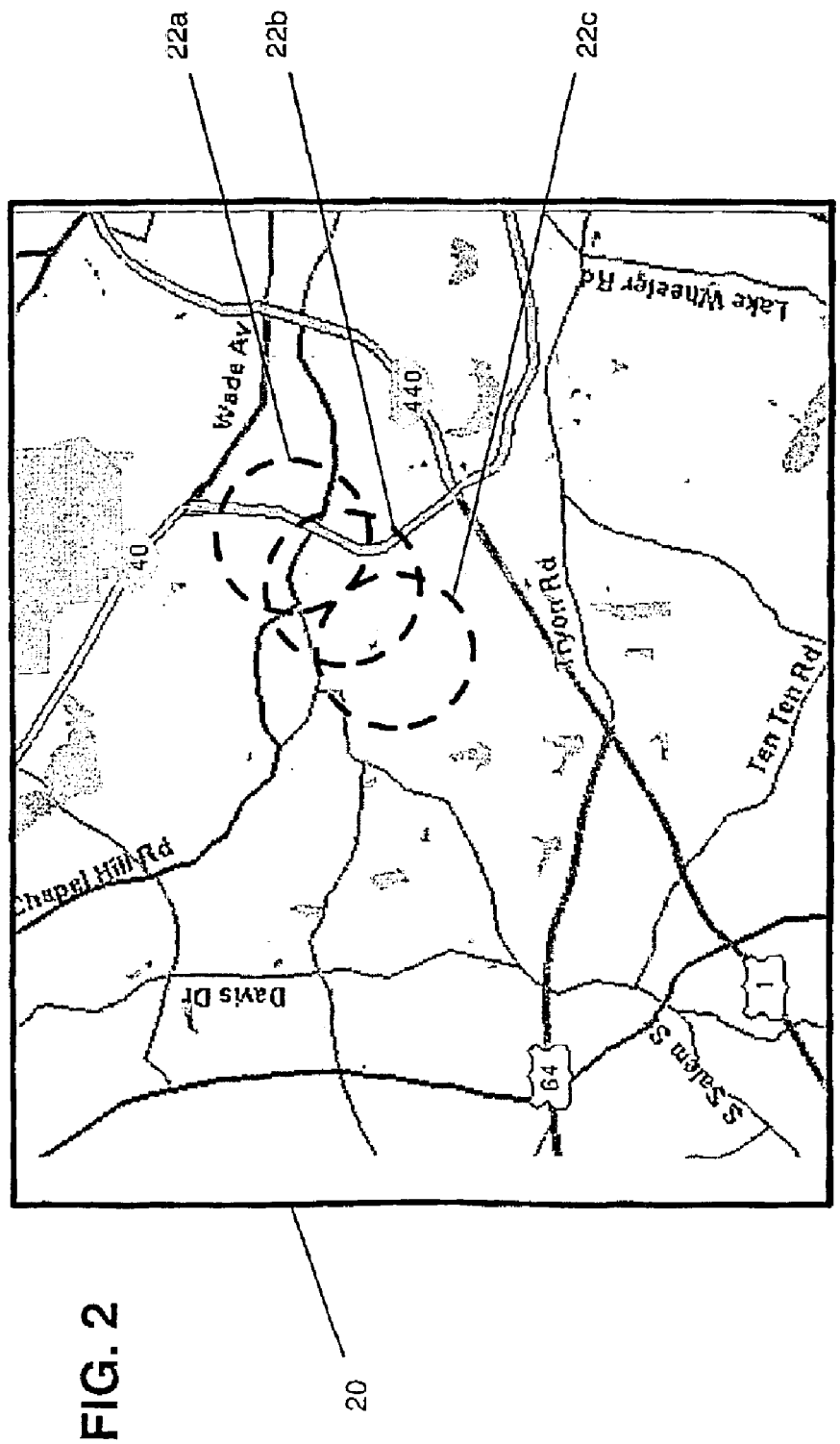
FIG. 2 is a sample screen display showing a live video feed integrated into a contextual map background.

FIG. 2 is a sample screen display showing a live video feed integrated into a contextual map background. The background map 20 shown here is a portion of a street map. The circles 22*a–c* represent a live video feed from a camera flying overhead. The area of the circle(s) corresponds to the field of view of the camera. Each circle represents a frame-by-frame shift in the live video feed as the camera flies over an area. For instance, circle 22*a* corresponds to frame 1, circle 22*b* corresponds to frame 2, and circle 22*c* corresponds to frame 3. The circles change heading as the camera changes heading.

In a similar manner, a street map or other image can be texture mapped over the background map to provide a detailed picture of an area. In a two-dimensional display, this is a simple process of knowing the coordinates of the image location, drawing a rectangle over the background, and texture mapping the image onto the rectangle. In a three-dimensional display, the image could also be textured onto an elevation grid, which allows it to display the gradations of the terrain beneath and make use of lighting to highlight elevation changes. Currently, the image that is read in is RGB format, but that can be expanded to include multiple image formats, such as a bitmap (BMP).

The background image maps can be obtained from any number of sources including, but not limited to, the United States Geological Survey (USGS) maps. For purposes of the present invention, the background maps are considered data to be imported and used by the processes of the present invention. Similarly, the position data of the camera including its heading information is data to be processed by the present invention. Thus, the coordinate system used is not critical to the present invention since the coordinate system merely represents data that can be translated. The present invention can thus be implemented to work with a variety of background images and a variety of coordinate systems without departing from the spirit or scope of the present invention.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, or tape. The media can also be a memory storage device or collection of memory storage devices such as read-only memory (ROM) or random access memory (RAM). Additionally, the computer program code can be transferred to the appropriate hardware over some type of data network.

The present invention has been described, in part, with reference to flowchart or logic flow diagrams. It will be understood that each block of the flowchart diagrams or logic flow diagrams, and combinations of blocks in the flowchart diagrams or logic flow diagrams, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks or logic flow diagrams.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart blocks or logic flow diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart blocks or logic flow diagrams.

Accordingly, block(s) of flowchart diagrams and/or logic flow diagrams support combinations of means for performing the specified functions, combinations of steps for performing the specified functions and program instruction means for performing the specified functions. It will also be understood that each block of flowchart diagrams and/or logic flow diagrams, and combinations of blocks in flowchart diagrams and/or logic flow diagrams can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

We claim:

1. A method of integrating a smaller image obtained from a movable video source moving along a heading into a larger background image that is larger than, and encompasses the field of view of, the video source, said method comprising:

texture mapping the smaller image onto a surface;

translating the texture mapped image so that it is centered around the view point of the moving video source;

translating the texture mapped image to the correct position relative to the larger background image by using position data pertaining to the moving video source;

rotating the texture mapped image so that it is tangent to the larger background image;
rotating the texture mapped image so that it is aligned with the heading of the moving video source;
scaling the texture mapped image so that it is the same scale as the larger background image; and
inserting, without blending, the texture mapped image into the larger background image.

2. A system for integrating a smaller image obtained from a movable video source moving along a heading into a larger background image that is larger than, and encompasses the field of view of, the video source, said system comprising:
a processing unit coupled with said moving video source for;
receiving video images and position data with respect to the source of the video images;
texture mapping said video images; and
performing matrix transformations on said texture mapped video images in order to manipulate the texture mapped video images so as to be insertable into a larger background image, wherein said matrix transformations comprise:
translating the texture mapped image so that it is centered around the view point of the moving video source;
translating the texture mapped image to the correct position relative to the larger background image by using position data pertaining to the moving video source;
rotating the texture mapped image so that it is tangent to the larger background image;
rotating the texture mapped image so that it is aligned with the heading of the moving video source; and
scaling the texture mapped image so that it is the same scale as the larger background image, and
a screen display coupled with said processing unit for displaying a combined texture mapped video image inserted into the larger background image, without blending.

3. A method of integrating a video feed obtained from a movable aerial video source moving along a heading into a larger background map image, where the background map image is larger than, and encompasses the field of view of, the movable aerial video source, said method comprising:
texture mapping each frame of the video feed onto a surface;
translating the texture mapped frames so that they are centered around the view point of the moving aerial video source;
translating the texture mapped frames to the correct position relative to the larger background image by using position data pertaining to the moving video source;
rotating the texture mapped frames so that they are tangent to the larger background map image;
rotating the texture mapped frames so that they are aligned with the heading of the moving aerial video source;
scaling the texture mapped frames so that they are the same scale as the larger background map image; and
inserting, without blending, the texture mapped frames into the larger background map image.

4. The method of claim 3 wherein said translating the texture mapped frames to the correct position relative to the larger background image step utilizes precise position data pertaining to the moving aerial video source that is synchronized with each frame of the video feed.

5. A system for integrating a video feed obtained from a movable aerial video source moving along a heading into a larger background map image, where the background map image is larger than, and encompasses the field of view of, the movable aerial video source, said system comprising:
a processing unit wirelessly coupled to said moving video source for:
receiving a video feed;
receiving position data with respect to the source of the video feed;
texture mapping each frame of the video feed; and
performing matrix transformations on said texture mapped video frames in order to manipulate the texture mapped video frames so as to be insertable into the larger background map image, wherein said matrix transformations comprise:
translating the texture mapped frames so that they are centered around the view point of the movable aerial video source;
translating the texture mapped frames to the correct position relative to the larger background map image by using position data pertaining to the moving video source;
rotating the texture mapped frames so that they are tangent to the larger background map image;
rotating the texture mapped frames so that they are aligned with the heading of the moving aerial video source; and
scaling the texture mapped frames so that they are the same scale as the larger background map image, and
a screen display coupled with said processing unit for displaying combined texture mapped video frames inserted into the larger background map image, without blending.

6. The system of claim 5 wherein said translating the texture mapped frames to the correct position relative to the larger background image utilizes precise position data pertaining to the movable moving aerial video source that is synchronized with each frame of the video feed.

7. A computer program product for integrating a smaller image obtained from a movable video source moving along a heading into a larger background image that is larger than, and encompasses the field of view of, the video source, the computer program product having a medium with a computer program embodied thereon, said computer program product comprising:
computer program code for texture mapping the smaller image onto a surface;
computer program code for translating the texture mapped image so that it is centered around the view point of the moving video source;
computer program code for translating the texture mapped image to the correct position relative to the larger background image by using position data pertaining to the moving video source;
computer program code for rotating the texture mapped image so that it is tangent to the larger background image;
computer program code for rotating the texture mapped image so that it is aligned with the heading of the moving video source;
computer program code for scaling the texture mapped image so that it is the same scale as the larger background image; and
computer program code for inserting, without blending, the texture mapped image into the larger background image.

* * * * *